United States Patent
Vik et al.

(10) Patent No.: US 10,017,035 B2
(45) Date of Patent: Jul. 10, 2018

(54) SYSTEM AND METHOD FOR CONTROLLING A MULTI-AXLE WORK VEHICLE BASED ON AXLE LOADING

(71) Applicant: CNH Industrial America, LLC, New Holland, PA (US)

(72) Inventors: Brian Vik, Barnesville, MN (US); Jason Novacek, West Fargo, ND (US); Mark Krogen, West Fargo, ND (US); David Tveito, West Fargo, ND (US); Russell Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 15/051,961

(22) Filed: Feb. 24, 2016

(65) Prior Publication Data

US 2017/0242447 A1 Aug. 24, 2017

(51) Int. Cl.
*B60K 1/00* (2006.01)
*B60W 30/184* (2012.01)
*E02F 3/04* (2006.01)

(52) U.S. Cl.
CPC ............ *B60K 1/00* (2013.01); *B60W 30/1843* (2013.01); *E02F 3/04* (2013.01); *B60W 2300/44* (2013.01); *B60W 2710/0677* (2013.01); *B60Y 2200/25* (2013.01)

(58) Field of Classification Search
CPC combination set(s) only.
See application file for complete search history.

(56) References Cited

U.S. PATENT DOCUMENTS

| | | |
|---|---|---|
| 5,295,921 A | 3/1994 | Ippolito et al. |
| 5,390,996 A | 2/1995 | Bliss |
| 5,505,482 A | 4/1996 | VanDenberg |
| 5,690,002 A | 11/1997 | Showalter |
| 5,699,888 A | 12/1997 | Showalter |
| 5,884,738 A | 3/1999 | Joslin et al. |
| 6,098,770 A | 8/2000 | Isley, Jr. |
| 6,533,090 B2 | 3/2003 | Osborn et al. |
| 6,578,654 B2 | 6/2003 | Porter |
| 6,766,236 B1 | 7/2004 | Lamela et al. |
| 6,779,420 B2 | 8/2004 | Peura |
| 6,803,530 B2 | 10/2004 | Carlstom et al. |
| 6,860,145 B2 | 3/2005 | Bergst et al. |
| 7,027,900 B2 | 4/2006 | Kumar et al. |

(Continued)

FOREIGN PATENT DOCUMENTS

| | | |
|---|---|---|
| DE | 2910180 | 10/1980 |
| DE | 19513516 | 10/1996 |

(Continued)

*Primary Examiner* — Jelani A Smith
(74) *Attorney, Agent, or Firm* — Rickard K. DeMille; Rebecca L. Henkel (57) ABSTRACT

A method for controlling a multi-axle work vehicle based on axle loading may generally include monitoring a load associated with loads transmitted through a pivot pin of a track assembly of the work vehicle, wherein the track assembly is configured to be rotatably coupled to an engine of the work vehicle via an axle assembly. In addition, the method may include estimating an axle load applied through the axle assembly based on the monitored load and providing a control output for the work vehicle based on the estimated axle load.

19 Claims, 6 Drawing Sheets

(56) References Cited

U.S. PATENT DOCUMENTS

| | | | |
|---|---|---|---|
| 7,072,763 | B2 | 7/2006 | Saxon et al. |
| 7,507,917 | B2 | 3/2009 | Kaltenheuser |
| 8,065,061 | B2 | 11/2011 | O'Neal |
| 8,280,591 | B2 | 10/2012 | Serarslan et al. |
| 8,612,066 | B2 | 12/2013 | O'Neal |
| 8,727,047 | B2 | 5/2014 | Janzen et al. |
| 8,965,640 | B2 | 2/2015 | Faivre et al. |
| 8,972,129 | B2 | 3/2015 | Faivre et al. |
| 8,985,250 | B1 | 3/2015 | Lussier et al. |
| 9,078,391 | B2 | 7/2015 | Pichlmaier |
| 9,086,698 | B2 | 7/2015 | Faivre et al. |
| 2010/0077715 | A1* | 4/2010 | Hohlfeld ............ A01D 41/127 56/228 |
| 2014/0125118 | A1* | 5/2014 | Nagorcka ............ B62D 55/14 305/125 |
| 2014/0343774 | A1 | 11/2014 | Wimmer et al. |
| 2016/0023695 | A1* | 1/2016 | Obermeier-Hartmann ............ B62D 55/112 180/9.54 |
| 2017/0177011 | A1* | 6/2017 | Garvin .................. G05D 13/66 |

FOREIGN PATENT DOCUMENTS

| | | |
|---|---|---|
| DE | 19921856 | 11/2000 |
| EP | 1190885 | 3/2002 |
| WO | WO 2013/190570 | 12/2013 |

\* cited by examiner

SYSTEM AND METHOD FOR CONTROLLING A MULTI-AXLE WORK VEHICLE BASED ON AXLE LOADING

FIELD OF THE INVENTION

The present subject matter relates generally to track-driven work vehicles and, more particularly, to a system and method for controlling a track-driven, multi-axle work vehicle based on axle loading.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For instance, for a four-wheel drive track-driven vehicle, a drive wheel of each front track assembly is typically rotationally coupled to a front axle assembly of the work vehicle for transferring torque transmitted from the engine to the front track assembly while a drive wheel of each rear track assembly is typically rotationally coupled to a rear axle assembly of the work vehicle for transferring torque transmitted from the engine to the rear track assembly. As is generally understood, each drive wheel may be configured to rotationally engage a corresponding endless track of the associated track assembly such that rotation of the drive wheel rotates the track, thereby allowing the vehicle to be driven forward or backward.

For a multi-axle work vehicle, the most efficient use of engine power is to load each axle equally. However, due to implement loading and/or weight transfer on the work vehicle, current control systems are not equipped to properly balance the loading applied across the front and rear axle assemblies. As a result, such conventional control systems are typically configured to limit the engine torque output to a pre-determined torque limit calculated based on a worst-case scenario for the axle load imbalances that may occur during operation of the associated work vehicle. As such, the torque output for the engine may be significantly limited during normal operation of the work vehicle.

Accordingly, an improved system and method for controlling a multi-axle work vehicle based on axle loading would be welcomed in the technology. In this regard, a specific need exists for a system and method that allows for the engine torque output of a multi-axle work vehicle to be controlled based on differences in the axle loading between separate axle assemblies of the work vehicle.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling a multi-axle work vehicle based on axle loading, wherein the work vehicle includes a chassis and an engine supported by the chassis. The system may include a track assembly having a drive wheel and an undercarriage support beam. The drive wheel may be configured to be rotatably coupled to the engine via an axle assembly. The track assembly may also include a pivot pin configured to pivotally couple the undercarriage support beam to the chassis. The system may also include a sensor configured to monitor a load associated with loads transmitted through the pivot pin and a controller communicatively coupled to the sensor. The controller may be configured to estimate an axle load applied through the axle assembly based on the monitored load. In addition, the controller may be configured to regulate the operation of the engine based on the estimated axle load.

In another aspect, the present subject matter is directed to a method for controlling a multi-axle work vehicle based on axle loading. The method may include monitoring a load associated with loads transmitted through a pivot pin of a track assembly of the work vehicle, wherein the track assembly is configured to be rotatably coupled to an engine of the work vehicle via an axle assembly. In addition, the method may include estimating an axle load applied through the axle assembly based on the monitored load and providing a control output for the work vehicle based on the estimated axle load.

In a further aspect, the present subject matter is directed to a method for controlling engine torque output for a multi-axle work vehicle based on axle loading. The method may generally include monitoring a first load associated with loads transmitted through a first pivot pin of a first track assembly of the work vehicle, wherein the first track assembly is configured to be rotatably coupled to an engine of the work vehicle via a first axle assembly. The method may also include monitoring a second load associated with loads transmitted through a second pivot pin of a second track assembly of the work vehicle, wherein the second track assembly is configured to be rotatably coupled to the engine via a second axle assembly. In addition, the method may include determining a load differential between the first and second axle assemblies based on the first and second loads and reducing a torque output limit for the engine when the load differential increases above a load differential threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a track-based, multi-axle work vehicle based on axle loading. Specifically, in several embodiments, the system may include one or more load sensors provided in operative association with a pivot pin(s) of one or more track assemblies of the work vehicle. For instance, in a particular embodiment, one or more load sensor(s) may be provided in operative associated with at least one pivot pin of a front track assembly of the work vehicle and one or more load sensors may be provided in operative association with at least one pivot pin of a rear track assembly of the work vehicle. Each load sensor may be configured to detect the load(s) being transmitted through its associated pivot pin, which may provide an indication of the torsional load being applied through the axle assembly providing engine power to the corresponding track assembly. As such, by monitoring the load(s) being transmitted through the pivot pin(s) for the one or more of the vehicle's track assemblies, a controller of the system may be configured to estimate an axle load being applied through one or more of the vehicle's axle assemblies.

The axle load estimated by the controller may then be used to provide a control output for the work vehicle. For instance, in one embodiment, the controller may adjust a torque output limit for the engine based on the estimated axle load. In other embodiments, the controller may be configured to provide a control output associated with any other suitable vehicle-related parameters, conditions, settings and/or data. For instance, the control output may be associated with adjusting a ballast setting of the work vehicle based on the estimated axle load, such as by generating a notification for display to the operator (e.g., via a display device positioned in the operator's cab) that provides the operator with a ballast recommendation based on the vehicle's current axle loading and/or by transmitting a control signal that automatically adjusts the ballast setting for the work vehicle using an automatic ballast adjustment system. As another example, the control output may be associated with adjusting a service or maintenance interval for the work vehicle based on the current axle loading.

In several embodiments, the system may include one or more sensors configured to monitor the loads transmitted through a pivot pin(s) associated with a single axle assembly of the work vehicle (e.g., by monitoring the loads transmitted through the pivot pin(s) of one or both of the vehicle's rear track assemblies or the loads transmitted through the pivot pin(s) of one or both of the vehicle's front track assemblies). Alternatively, system may include one or more sensors configured to monitor the loads transmitted through the pivot pins associated with differing axle assemblies of the work vehicle. For instance, as will be described below, in one embodiment, the system may include sensors configured to monitor the loads transmitted through one or more pivot pin(s) of both the front and rear track assemblies. In such an embodiment, based on the monitored loads, the controller may be configured to estimate an axle load differential existing between the front and rear axle assemblies. The controller may then adjust the torque output limit for the engine, if necessary or desired, based on the load differential. For instance, if the load differential exceeds a predetermined load differential threshold, the controller may be configured to reduce the torque output limit for the engine so as to prevent damage to any drivetrain components due to the existing axle load imbalance. However, if the load differential drops below the predetermined load differential threshold, the controller may be configured to increase the torque output limit for the engine. For instance, the controller may increase the torque output limit to the maximum achievable torque output for the engine, thereby allowing the engine power to be maximized.

Figure 1:
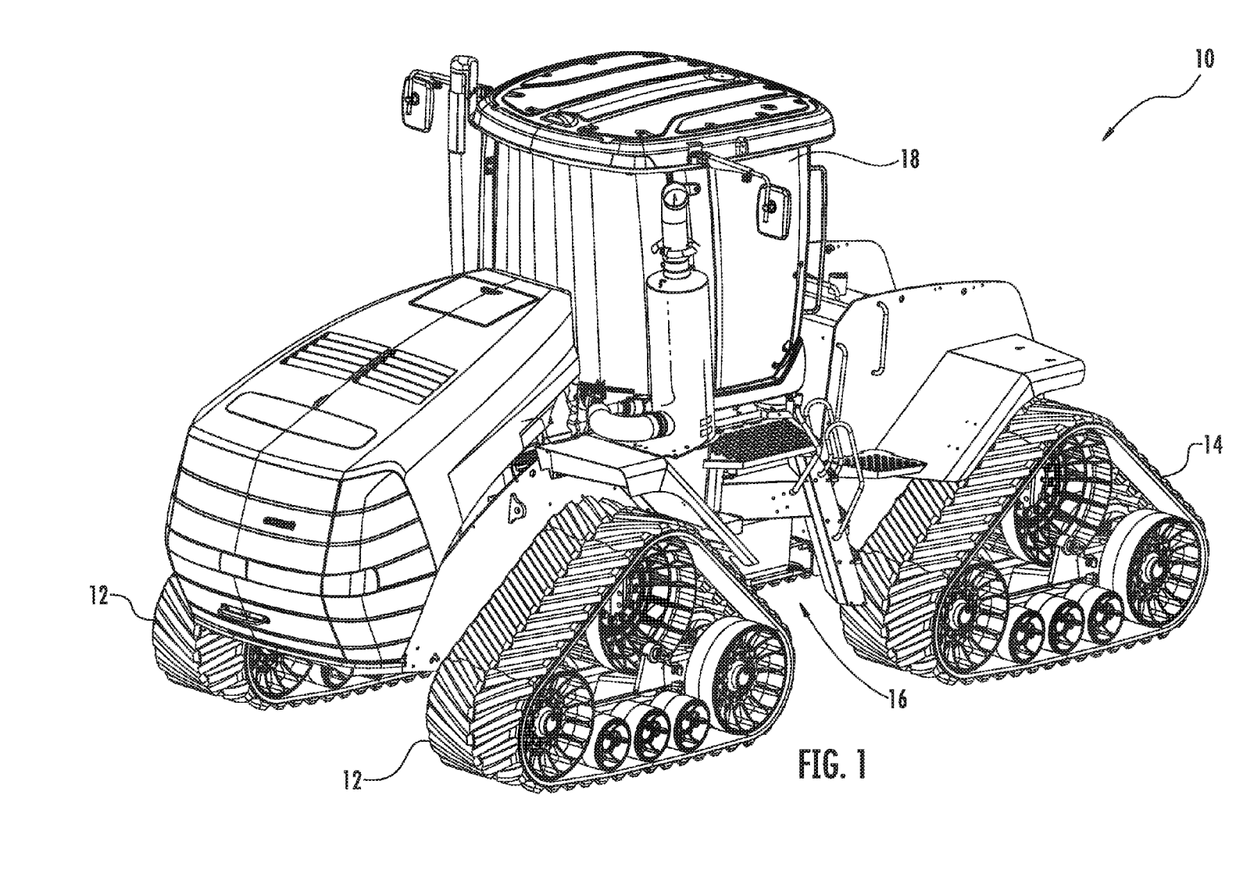
FIG. 1 illustrates a perspective view of one embodiment of a track-driven work vehicle in accordance with aspects of the present subject matter.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. As will be described below with reference to FIG. 3, the work vehicle 10 may also include a drivetrain including an engine, a transmission and front and rear axle assemblies supported by the chassis 16. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Figure 2:
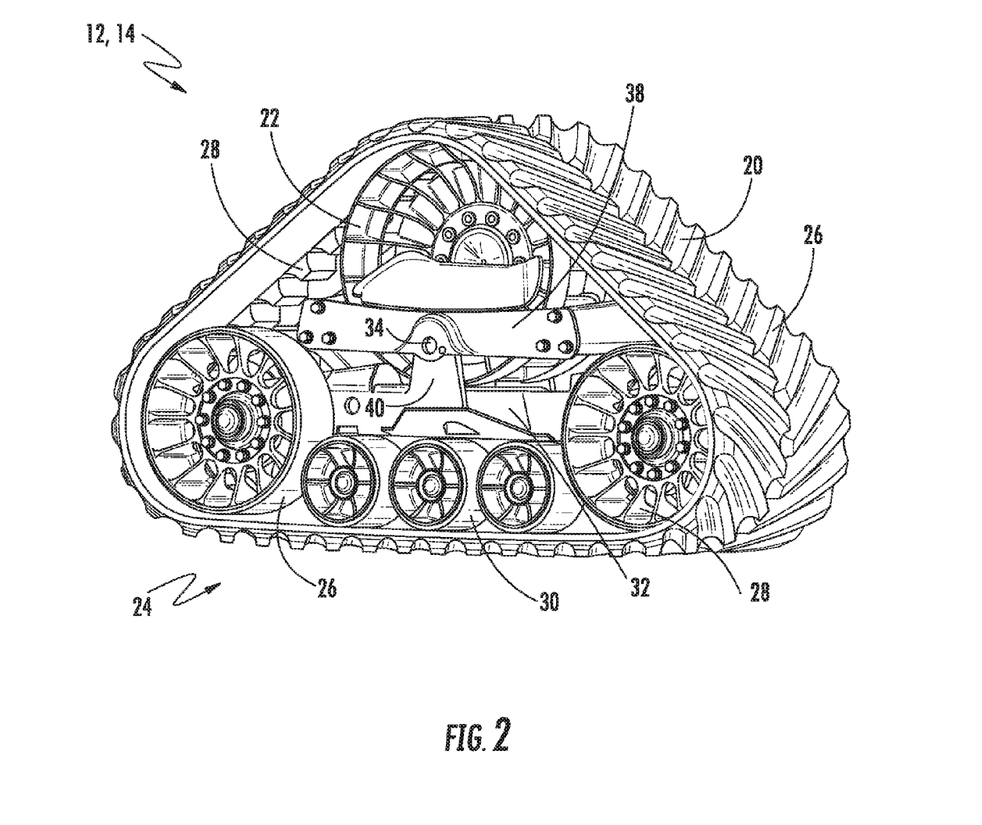
FIG. 2 illustrates a perspective view of one embodiment of a track assembly suitable for use with the work vehicle shown in FIG. 1 in accordance with aspects of the present subject matter.

Referring now to FIG. 2, a perspective view of an exemplary embodiment of one of the front track assemblies 12, 14 shown in FIG. 1 is illustrated in accordance with aspects of the present subject matter. As shown, the track assembly 12, 14 may generally include a track 20, a drive wheel 22 for mechanically engaging the track 20, and an undercarriage 24. The undercarriage 24 may include front and rear idler wheels 26, 28 about which the track 20 is wrapped and a plurality of roller wheels 30 for guiding the track 20. Additionally, the undercarriage 24 may include an undercarriage support beam 32 configured to support the idler and roller wheels 26, 28, 30. For example, as shown in FIG. 2, the undercarriage support beam 32 may extend fore-to-aft within the track assembly 12, 14 to allow the various wheels 26, 28, 30 to be coupled thereto.

Figure 3:
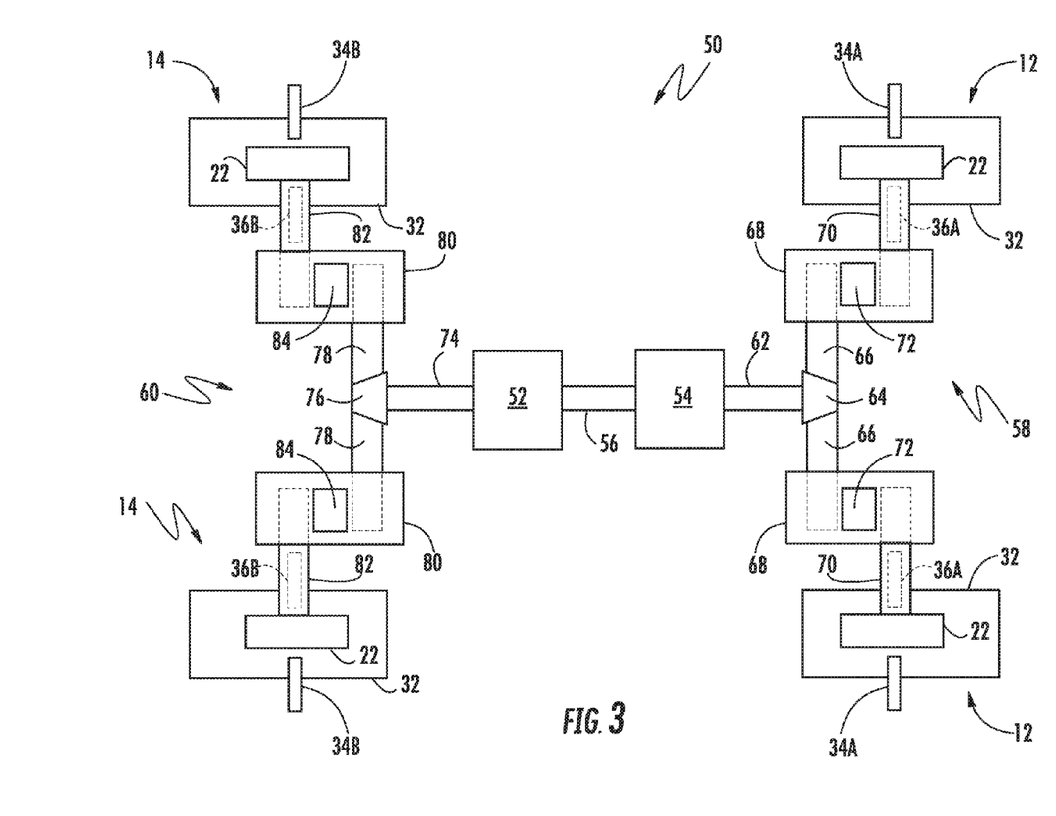
FIG. 3 illustrates a simplified, schematic view of one embodiment of various drivetrain components suitable for use with the work vehicle shown in FIG. 1 in accordance with aspects of the present subject matter.

As is generally understood, the undercarriage support beam 32 may be pivotally supported on the vehicle chassis 16 (FIG. 1) by two pivot pins, namely an outboard pivot pin 34 and an inboard pivot pin 36 (FIG. 3). The outboard pivot pin 34 is located outboard of the drive wheel 22 while the inboard pivot pin 36 is located inboard of the drive wheel 22 and is secured on the vehicle chassis 16. In general, the outboard pivot pin 34 may be configured to be coupled between an undercarriage bearing support member 38 and a bracket 40 secured to the undercarriage support beam 32. For example, the pivot pin 34 may be configured to be received within corresponding openings (not shown) defined through the bearing support member 38 and the bracket 40. The bearing support member 38 may, in turn, be secured at each of its ends to support posts (not shown) coupled to the vehicle chassis 16. As such, the outboard pivot pin 34 may serve to pivotally couple the undercarriage support beam 32 to the chassis 16.

It should be appreciated that a similar pivotal support arrangement may also be provided on the vehicle chassis 16 inboard of the drive wheel 22 utilizing the inboard pivot pin 36. For example, a separate bracket (not shown) located inboard of the drive wheel 22 may be coupled to the undercarriage support beam 32. In such an embodiment, the inboard pivot pin 36 may be pivotally coupled between the inboard bracket and the chassis 16 to provide a pivotal connection between the undercarriage support beam 32 and the chassis 16.

It should also be appreciated that the track assembly 12, 14 shown in FIG. 2 is simply illustrated to provide one example of a suitable track assembly configuration. In other embodiments, the track assembly 12, 14 may have any other suitable track-based configuration, including having any suitable number of idler wheels 24 and/or defining any suitable shape.

Referring now to FIG. 3, a schematic, simplified view of one embodiment of a drivetrain 50 suitable for transferring power to the drive wheels 22 of the track assemblies 12, 14 of the work vehicle 10 described above is illustrated in accordance with aspects of the present subject matter. As shown, the drivetrain 50 may generally include an engine 52 and a transmission 54 configured to be mounted on the chassis 16 (FIG. 1) of the work vehicle 10. The transmission 54 may be operably coupled to the engine 52 via one or more output shafts 56 and may be configured to provide variably adjusted gear ratios for transferring engine power to the drive wheels 22 of the front and rear track assemblies 12, 14. As shown in FIG. 3, engine power may be transferred to each front track assembly 12 via a front axle assembly 58 while engine power may be transferred to each rear track assembly 14 via a rear axle assembly 60. The front axle assembly 58 may include a drive shaft 62 coupled to a front differential 64 and one or more front axle shafts 66 coupled to the front differential 54 for transferring power to the respective drive wheels 22 of the front track assemblies 12 via corresponding front track drive boxes 68. For example, as shown in FIG. 3, the front axle shaft(s) 66 may be rotationally coupled to drive shafts 70 associated with the drive wheels 22 via one or more internal gears 72 of the front track drive boxes 68. Similarly, the rear axle assembly 60 may include a drive shaft 74 coupled to a rear differential 76 and one or more rear axle shafts 78 coupled to the rear differential 76 for transferring power to the respective drive wheels 22 of the rear track assemblies 14 via rear track drive boxes 80. For example, as shown in FIG. 3, the rear axle shaft(s) 78 may be rotationally coupled to drive shafts 82 associated with the drive wheels 22 via one or more internal gears 84 of the rear track drive boxes 80.

Additionally, as indicated above, the front and rear track assemblies 12, 14 may include pivot pins 34, 36 for pivotally coupling each undercarriage support beam 32 to the vehicle chassis 16. As shown schematically in FIG. 3, each front track assembly 12 may include a front outboard pivot pin 34A located outboard of its drive wheel 22 and a front inboard pivot pin 36A (shown in dashed lines) located inboard of the drive wheel 22. Similarly, each rear track assembly 14 may include a rear outboard pivot pin 34B located outboard of its drive wheel 22 and a rear inboard pivot pin 36B (shown in dashed lines) located inboard of the drive wheel 22.

It should be appreciated that, although the configuration of the work vehicle 10 shown in FIG. 3 includes two axle assemblies, the work vehicle 10 may generally have any number of axle assemblies. For instance, in one embodiment, the work vehicle 10 may include three axle assemblies.

Figure 4:
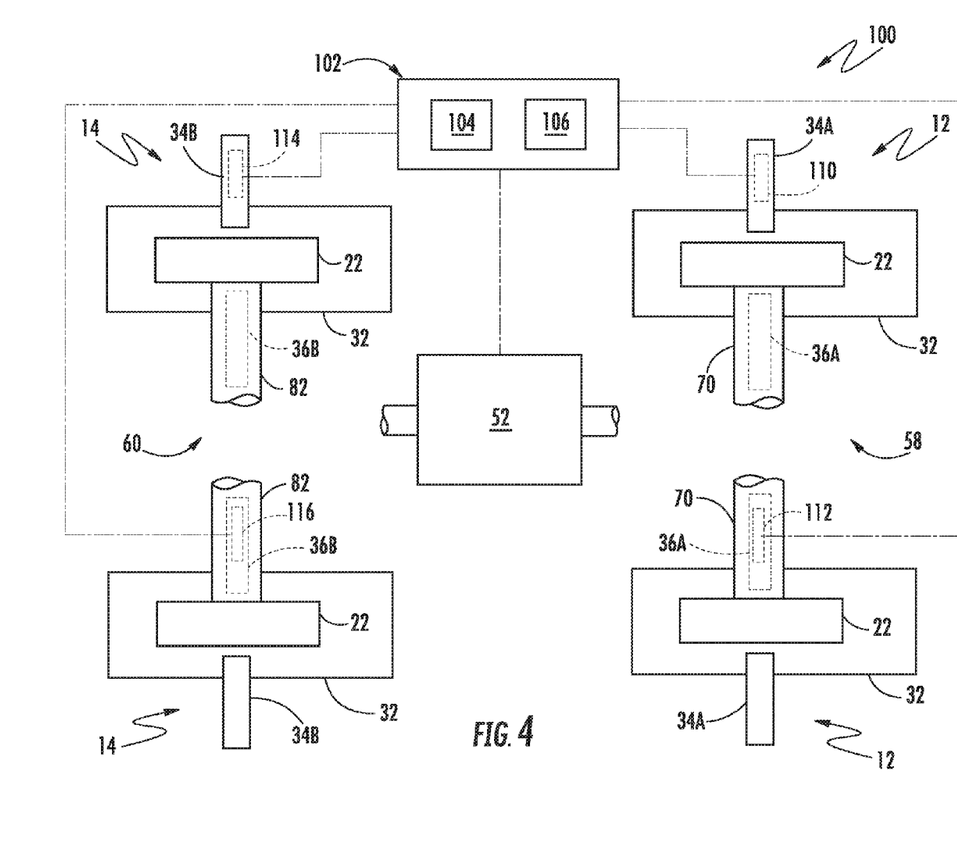
FIG. 4 illustrates a simplified, schematic view of one embodiment of a system for controlling a multi-axle work vehicle based on axle loading in accordance with aspects of the present subject matter.

Referring now to FIG. 4, a schematic view of one embodiment of a system 100 for controlling a multi-axle work vehicle based on axle loading is illustrated in accordance with aspects of the present subject matter. Specifically, FIG. 4 illustrates a partial, schematic view of portions of the components of the track assemblies 12, 14 and the driveline 50 described above with reference to FIG. 3. For example, FIG. 4 illustrates schematic views of the front pivot pins 34A, 36A configured to couple the undercarriage support beam 32 of each front track assembly 12 to the chassis 16 as well a portion of the front axle assembly 58 (e.g., the drive shafts 70) utilized to rotatably couple the drive wheels 22 of the front track assemblies 12 to the engine 52. In addition, FIG. 4 illustrates schematic views of the rear pivot pins 34B, 36B configured to couple the undercarriage support beam 32 of each rear track assembly 14 to the chassis 16 as well a portion of the rear axle assembly 60 (e.g., the drive shafts 82) utilized to rotatably couple the drive wheels 22 of the rear track assemblies 14 to the engine 52.

As shown, the system 100 may generally include a controller 102 configured to provide control outputs for controlling one or more components of the work vehicle 10, such as the engine 52 and/or the transmission 54 of the work vehicle 10. For example, as will be described below, the controller 102 may be configured to provide suitable control outputs for regulating the torque output limit of the engine 52 based on load measurements associated with the loads being applied through the front and/or rear axle assemblies 58, 60 so as to prevent damage to the driveline components. In addition, the controller 102 may be configured to provide suitable control outputs associated with generating operator notifications and/or for modifying data stored within the controller 102.

In general, the controller 102 may correspond to any suitable processor-based device known in the art, such as any suitable computing device and/or any combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store suitable computer-readable instructions that, when executed by the processor(s) 104, configure the controller 102 to perform various computer-implemented functions, such as the methods described herein. In addition, the controller 102 may also include various other suitable components, such as a communications circuit or module, one or more input/output channels, a data/control bus and/or the like.

It should be appreciated that the controller 102 may correspond to an existing controller of the work vehicle 10 or the controller 102 may correspond to a separate processing device. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

In several embodiments, the controller 102 may be configured to monitor the loads (e.g., torsional loads) transmitted through each axle assembly 58, 60 of the work vehicle 10. Specifically, in accordance with aspects of the present subject matter, such axle loading may be indirectly monitored by the controller 102 by monitoring the loads transmitted through one or more of the pivot pins 34A, 36A, 34B, 36B associated with each track assembly 12, 14 of the work vehicle 10. For example, in one embodiment, each track assembly 12, 14 may include one or more load sensors 110, 112, 114, 116 provided in operative association with one or both of its pivot pins 34A, 36A, 34B, 36B. Each load sensor 110, 112, 114, 116 may be configured to sense the loads being transmitted through its corresponding pivot pin 34A, 36A, 34B, 36B between the associated undercarriage support beam 32 and the vehicle chassis 16. Such detected loads may then be utilized, in one embodiment, to calculate or estimate the torsional loads being applied through each axle assembly 58, 60. For instance, the sensors 110, 112, 114, 116 may be configured to monitor the vertical load being transmitted through each pivot pin 34A, 36A, 34B, 36B, which is indicative of the overall weight acting on each track assembly 12, 14. The weight acting on each track assembly 12, 14 is, in turn, generally proportional to the magnitude of the tractive effort being applied through each axle assembly 58, 60, which is indicative of the torsional load being applied through such axle assemblies 12, 14. Thus, by monitoring the vertical loads transmitted through the front and rear pivot pins 34A, 36A, 34B, 36B, the torsional load being applied through the front and rear axle assemblies 58, 60 may be calculated or estimated. It should be appreciated that a similar calculation may be used to correlate the horizontal loads transmitted through the front and rear pivot pins 34A, 36A, 34B, 36B to the torsional loads being applied through the front and rear axle assemblies 58, 60 (e.g., by correlating the horizontal pin loads to the weight acting on each track assembly 12, 14 as a function of the frictional forces on the track assembly 12, 14).

It should be appreciated that the load sensors 110, 112, 114, 116 may be provided in operative association with the outboard pivot pins 34A, 34B and/or the inboard pivot pins 36A, 36B of each track assembly 12, 14. For example, in the illustrated embodiment, one of the front track assemblies 12 includes a load sensor 110 (indicated by dashed lines) associated with its front outboard pivot pin 34A while the other front track assembly 12 includes a load sensor 112 (indicated by dashed lines) associated with its front inboard pivot pin 36A. Similarly, one of the rear track assemblies 14 includes a load sensor 114 (indicated by dashed lines) associated with its rear outboard pivot pin 34B while the other rear track assembly 14 includes a load sensor 116 (indicated by dashed lines) associated with its rear inboard pivot pin 36B. However, in other embodiments, the system 100 may have any other suitable sensor configuration, such as by including load sensors associated with only the outboard pivot pins 34A, 34B of the track assemblies 12, 14 or only the inboard pivot pins 36A, 36B of the track assemblies 12, 14 and/or by including load sensors associated with both the outboard and inboard pivot pins 34A, 36A, 34B, 36B of each track assembly 12, 14.

In several embodiments, the load sensors 110, 112, 114, 116 may be integrated into or otherwise form part of each pivot pin 34A, 36A, 34B, 36B. Specifically, in one embodiment, the pivot pins 34A, 36A, 34B, 36B may correspond to load-sensing pins. In such instance, each load sensor 110, 112, 114, 116 may be built-into its corresponding pivot pin 34A, 36A, 34B, 36B. For example, load-sensing pins are known that incorporate internal strain gauge transducers and/or other load sensors for monitoring loads being transmitted through the pins. Such load-sensing pins are commercially available from various suppliers, including, but not limited to, Strainsert, Inc. of Conshohocken, Pa.

Alternatively, the load sensors 110, 112, 114, 116 may correspond to separate components configured to be provided in operative association with their corresponding pivot pins 34A, 36A, 34B, 36B. For instance, the load sensors 110, 112, 114, 116 may correspond to strain gauges configured to be coupled to an exterior surface of each pivot pin 34A, 36A, 34B, 36B. In another embodiment, load sensors 110, 112, 114, 116 may correspond to compressive load sensors configured to be provided between each pivot pin 34A, 36A, 34B, 36B and an adjacent component of the work vehicle 10 (e.g., the brackets coupled between each pivot pin 34A, 36A, 34B, 36B and the corresponding undercarriage support beams 32, the bearing support members 38 and/or the chassis 16).

As indicated above, the loads transmitted through the pivot pins 34A, 36A, 34B, 36B associated with the front and rear track assemblies 12, 14 may provide an indication to the controller 102 of the torsional loads being applied through the front and rear axle assemblies 58, 60, respectively. Based on the axle loads, the controller 102 may then be configured to adjust the torque output limit of the engine 52, if necessary or desired, in order to prevent damage from occurring to the drivetrain components of the work vehicle 10. Specifically, in several embodiments, the controller 102 may be configured to both determine a load differential existing between the front and rear axle assemblies 58, 60 based on the loads being transmitted through the pivot pin(s) 34A, 36A, 34B, 36B and compare such load differential to a predetermined load differential threshold defined for the work vehicle 10. In such embodiments, if the load differential between the front and rear axle assemblies 58, 60 is less than the load differential threshold, it may be assumed that the torsional loads being applied through the front and rear axle assemblies 58, 60 are balanced or at least substantially balanced. As such, the controller 102 may be configured to control the operation of the engine 52 so as to maximize the torque output being transmitted to the axle assemblies 58, 60, such as by setting the torque output limit of the engine 52 to provide maximum engine power. Alternatively, if the load differential between the front and rear axle assemblies 58, 60 exceeds the load differential threshold, it may be assumed that the torsional loads being applied through the front and rear axle assemblies 58, 60 are substantially imbalanced. In such instance, the controller 102 may be configured reduce the torque output limit for the engine 52 to an appropriate torque setting, thereby allowing the system 100 to prevent damage to the drivetrain components due to the existence of such axle load imbalance.

It should be appreciated that the load differential calculated by the controller 102 may correspond to the differential between any of the load(s) directly or indirectly associated with the torsional loads being applied to the axle assemblies 58, 60, including the loads directly monitored by the load sensors 110, 112, 114, 116 and/or any loads calculated based on the load measurements provided by the load sensors 110, 112, 114, 116. For instance, in one embodiment, the load measurements provided by the load sensor(s) 110, 112 associated with the front track assembly(ies) 12 may be compared to the load measurement provided by the load sensor(s) 114, 116 associated with the rear track assembly(ies) 14 to determine the load differential, such as by determining the load differential between the vertical or horizontal load(s) measured at the front pivot pin(s) 34A, 36A and the vertical or horizontal load(s) measured at the rear pivot pin(s) 34B, 36B. In another embodiment, the load measurements provided by the load sensors 110, 112, 114, 116 may be used initially to calculate or estimate one or more related drivetrain loads, such as the tractive effort and/or the torsional loads associated with each axle assembly 58, 60. In such an embodiment, the tractive effort and/or torsional load calculated or estimated for each axle assembly 58, 60 may be compared to determine the load differential. Regardless, the load differential threshold may be selected based on the specific loads being compared by the controller 102 so that, when the load differential exceeds the predetermined threshold, it may be assumed that a substantial load imbalance exists between the front and rear axle assemblies 58, 60, thereby indicating the need for the controller 102 to perform a suitable corrective action (e.g., reducing the torque output limit for the engine 52) to prevent damage from occurring to the drivetrain components.

Additionally, it should be appreciated that, when the monitored load differential shifts from being less than the differential load threshold to being greater than such threshold, the controller may generally be configured to reduce the torque output limit for the engine 52 according to any suitable control methodology and/or scheme. Specifically, in several embodiments, the controller 102 may be configured to reduce the torque output limit for the engine 52 to a predetermined torque limit regardless of which axle assembly 58, 60 is experiencing the greatest loads. For instance, in a particular embodiment, the controller 102 may be configured to reduce the torque output limit for the engine 52 to a torque limit ranging from 50% to less than 100% of the maximum torque output for the engine 52, such as a torque limit ranging from 50% to 90% of the maximum torque output or from 60% to 80% of the maximum torque output or from 65% to 75% of the maximum torque output and/or any other subranges therebetween. Alternatively, the controller 102 may be configured to consider which axle assembly 58, 60 is experiencing the highest loads when reducing the torque output limit for the engine 52. For example, if the load associated with the front axle assembly 58 exceeds the load associated with the rear axle assembly 60, the controller 102 may be configured to select a reduced torque output limit for the engine 52 based on a predetermined torque limit associated with the front axle assembly 58. Alternatively, if the load associated with the rear axle assembly 60 exceeds the load associated with the front axle assembly 58, the controller 102 may be configured to select a reduced torque output limit for the engine 52 based on a predetermined torque limit associated with the rear axle assembly 60.

In the illustrated embodiment, the system 100 includes a load sensor 110, 112, 114, 116 associated with each track assembly 12, 14 of the work vehicle 10. However, in other embodiments, the system 100 may include load sensors associated with any other suitable combination of the vehicle's track assemblies 12, 14. For example, in one embodiment, the system 100 may only include a load sensor(s) associated with one or both of the front track assemblies 12 (e.g., sensor 110 and/or sensor 112) or a load sensor(s) associated with one or both of the rear track assemblies 14 (e.g., sensor 114 and/or sensor 116). In such an embodiment, the controller 102 may be configured to estimate the axle loads being applied through either the front axle assembly 58 or the rear axle assembly 60 based on the monitored pivot pin loads associated with corresponding track assembly(ies). The controller 102 may then adjust the operation of the engine, as necessary or desired, based on a comparison of the estimated axle load for the single axle assembly to a predetermined load threshold associated with such axle assembly. For example, by monitoring the loads being transmitted through the pivot pin(s) 34B, 36B of one or both of the rear track assemblies 14, the controller 102 may estimate the current axle loading for the rear axle assembly 60 and compare such axle loading to a predetermined load threshold defined for the rear axle assembly 60. In such an embodiment, if the current axle loading for the rear axle assembly 60 exceeds the predetermined load threshold, the controller 102 may be configured to reduce the torque output limit for the engine 52 to prevent the occurrence of damage. A similar methodology may also be applied when monitoring the loads being transmitted through the pivot pin(s) 34A, 36A of one or both of the front track assemblies 14.

It should be appreciated that, in addition to regulating the torque output of the engine 52, the controller 102 may also be configured to provide any other suitable control output(s) based on the axle load(s) estimated using the sensor measurements. For example, the controller 102 may be configured to provide control outputs associated with adjusting a ballast setting for the work vehicle 10. Specifically, by estimating the axle load(s) applied through one or more of the vehicle's axle assemblies 58, 60, the controller 102 may be configured to determine a weight adjustment for the vehicle's ballast. For instance, based on the estimated axle load(s) applied through the rear axle assembly 60, the controller 102 may determine that the weight of the ballast carried on the front end of the work vehicle 10 may need to be increased or decreased. The controller 102 may then provide a suitable control output associated with adjusting the weight of the ballast. For instance, the controller 102 may be configured to generate a notification to be displayed to the operator (e.g., via a display device within the cab 18) that provides a ballast recommendation for the operator. The operator may then decide if he/she desires to adjust the vehicle's ballast based on the recommendation provided by the controller 102. Alternatively, for a work vehicle 10 including an automatic ballast adjustment system, the controller 102 may be configured to output a suitable control signal for automatically adjusting the vehicle's ballast based on the current axle loading estimated for the work vehicle 10.

In another embodiment, the controller 102 may be configured to provide control outputs associated with adjusting a service or maintenance interval for the work vehicle. Specifically, by estimating the axle load(s) applied through one or more of the vehicle's axle assemblies 58, 60, the controller 102 may be configured to calculate an updated service/maintenance interval for the work vehicle 10. For instance, if the estimated axle loads applied through the rear axle assembly 60 over a given period of time are higher than expected, the controller 102 may be configured to reduce the current interval for servicing and/or performing maintenance operations on the work vehicle 10. Similarly, if the estimated axle loads applied through the rear axle assembly 60 over a given period of time are lower than expected, the controller 102 may be configured to increase the current interval for servicing and/or performing maintenance operations on the work vehicle 10. The controller 102 may then provide a suitable control output associated with adjusting the vehicle's current service/maintenance interval, such as by providing a suitable control signal for adjusting the service/maintenance interval currently stored within the controller's memory 106 and/or by generating a notification to be displayed to the operator (e.g., via a display device within the cab 18) indicating that the service/maintenance interval for the work vehicle 10 has been adjusted (or will be adjusted) based on the current axle loading.

Figure 5:
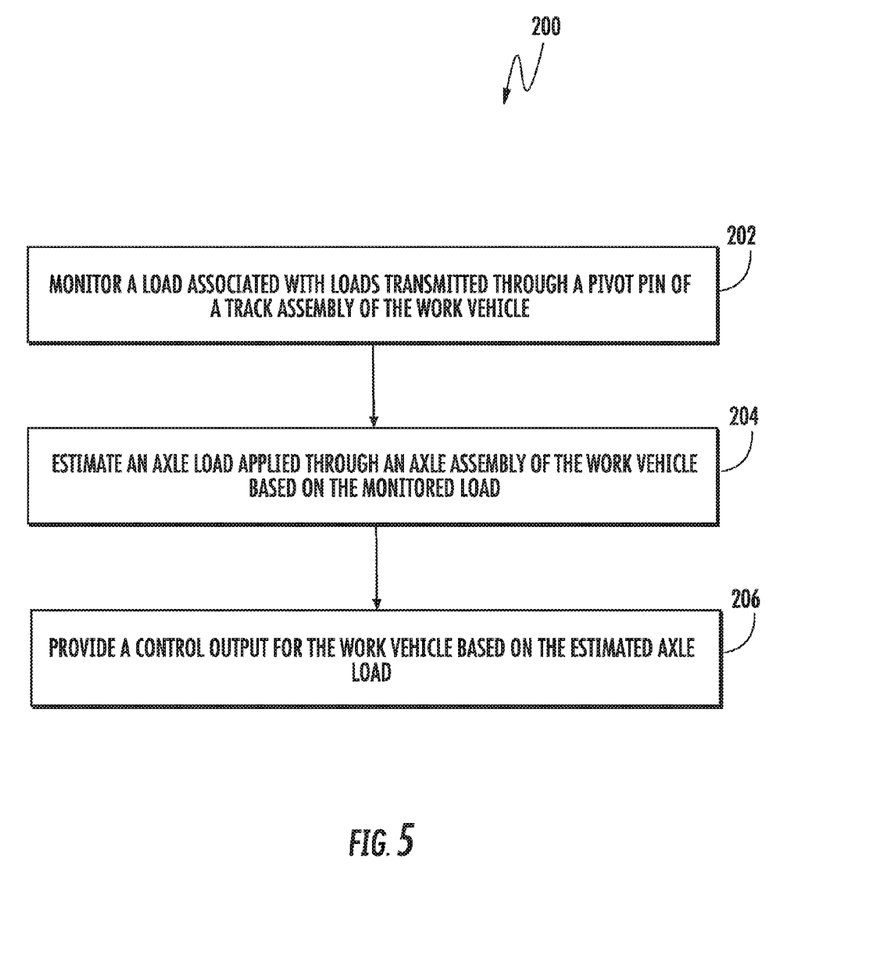
FIG. 5 illustrates a flow diagram of one embodiment of a method for controlling a multi-axle work vehicle based on axle loading in accordance with aspects of the present subject matter.

Referring now to FIG. 5, a flow diagram of one embodiment of a method 200 for controlling a multi-axle work vehicle based on axle loading is illustrated in accordance with aspects of the present subject matter. In general, the method 200 will be described herein with reference to the vehicle configuration shown in FIGS. 1-3 and the system 100 described above with reference to FIG. 4. However, it should be appreciated by those of ordinary skill in the art that the disclosed method 200 may also be implemented with any other suitable vehicle configuration and/or within any other suitable system. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 includes monitoring a load associated with loads transmitted through a pivot pin of a track assembly of the work vehicle. Specifically, as indicated above, one or more load sensors 110, 112, 114, 116 may be associated with the pivot pins 34A, 34B, 36A, 36B of one, some, or all of the track assemblies 12, 14. As such, the controller 102 may be configured to monitor a load(s) associated with the loads being transmitted through such pivot pin(s) 34A, 34B, 36A, 36B. For example, based on the sensor measurements, the controller 102 may be configured to directly monitor the vertical and/or horizontal loads being transmitted through the pivot pin(s) 34A, 34B, 36A, 36B and/or indirectly monitor the axle loads applied through one or both of the axle assemblies 58, 60.

Additionally, at (204), the method 200 may include estimating an axle load applied through an axle assembly of the work vehicle based on the monitored load. For example, as indicated above, the controller may be configured to correlate the load(s) being transmitted through the pivot pin(s) 34A, 34B, 36A, 36B to the axle load(s) associated with the front axle assembly 58 and/or rear axle assembly 60, such as the tractive effort and/or the torsional loads applied through the front axle assembly 58 and/or rear axle assembly 60.

Moreover, at (206), the method 200 may include providing a control output for the work vehicle based on the estimated axle load. As indicated above, the controller 102 may be configured to provide any suitable control output based on the estimated axle load. For example, the controller 102 may be configured to regulate the operation of the engine 52, such as by adjusting a torque output limit for the engine 52 based on the estimated axle load. Specifically, in one embodiment, the controller 102 may be configured to compare the estimated axle load to a predetermined load threshold defined for the axle assembly associated with such axle load. In such an embodiment, if the estimated axle load exceeds the predetermined load threshold, the controller 102 may be configured to reduce the torque output limit for the engine 52. In other embodiments, the controller 102 may be configured to provide a control output associated with adjusting an operational or service-based setting for the work vehicle 10, such as an output associated with adjusting the vehicle's ballast and/or the vehicle's current service/maintenance interval.

Figure 6:
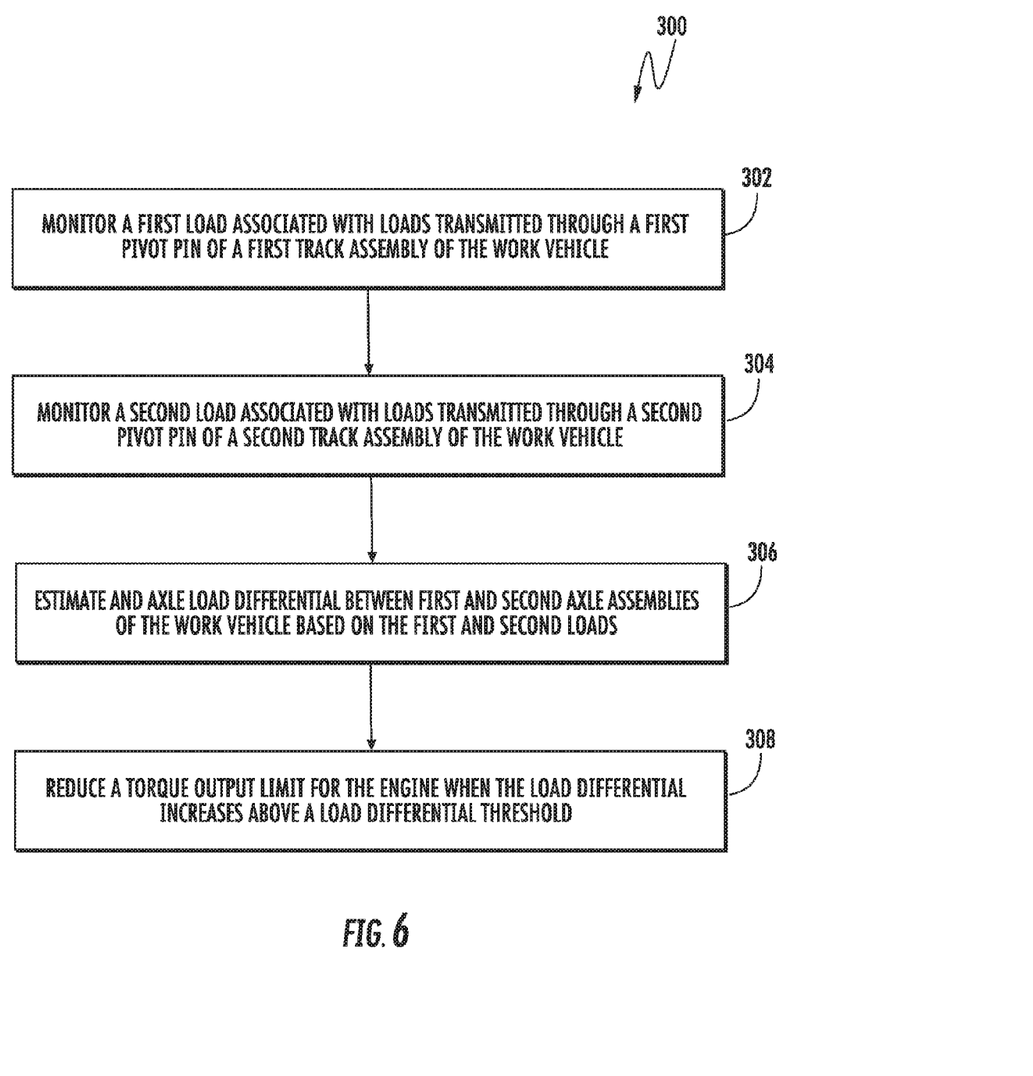
FIG. 6 illustrates a flow diagram of a specific embodiment of a method for controlling engine torque output for a multi-axle work vehicle based on axle loading in accordance with aspects of the present subject matter.

Referring now to FIG. 6, a flow diagram of a specific embodiment of a method 300 for controlling the engine torque output for a multi-axle work vehicle based on axle loading is illustrated in accordance with aspects of the present subject matter. In general, the method 300 will be described herein with reference to the vehicle configuration shown in FIGS. 1-3 and the system 100 described above with reference to FIG. 4. However, it should be appreciated by those of ordinary skill in the art that the disclosed method 300 may also be implemented with any other suitable vehicle configuration and/or within any other suitable system. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes monitoring a first load associated with loads transmitted through a first pivot pin of a first track assembly of the work vehicle. Specifically, as indicated above, one or more load sensors 110, 112 may be associated with the pivot pins 34A, 36A of the front track assemblies 12. As such, the controller 102 may be configured to monitor a load(s) associated with the loads being transmitted through such pivot pin(s) 34A, 36A. For example, based on the sensor measurements, the controller 102 may be configured to directly monitor the vertical and/or horizontal loads being transmitted through the front pivot pin(s) 34A, 36A and/or indirectly monitor one or more axle load(s) associated with the load(s) being transmitted through the front pivot pin(s) 34A, 36A, such as the tractive effort and/or the torsional loads applied through the front axle assembly 58.

Additionally, at (304), the method 300 includes monitoring a second load associated with loads transmitted through a second pivot pin of a second track assembly of the work vehicle. Specifically, as indicated above, one or more load sensors 114, 116 may be associated with the pivot pins 34B, 36B of the rear track assemblies 14. As such, the controller 102 may be configured to monitor a load(s) associated with the loads being transmitted through such pivot pin(s) 34B, 36B. For example, based on the sensor measurements, the controller 102 may be configured to directly monitor the vertical and/or horizontal loads being transmitted through the rear pivot pin(s) 34B, 36B and/or indirectly monitor one or more axle load(s) associated with the load(s) being transmitted through the rear pivot pin(s) 34B, 36B, such as the tractive effort and/or the torsional loads applied through the rear axle assembly 60.

Referring still to FIG. 6, at (306), the method 300 may also include determining a load differential existing between first and second axle assemblies of the work vehicle based on the first and second loads. Specifically, as indicated above, the controller 102 may be configured to compare the loads determined based on the sensor measurements provided by the load sensors 110, 112, 114, 116. As such, the controller 102 may determine a load differential existing between the load(s) associated with the front axle assembly 58 and the load(s) associated with the rear axle assembly 60.

Moreover, at (308), the method 300 may include reducing a torque output limit for the engine when the load differential increases above a load differential threshold. For instance, in one embodiment, the controller 102 may reduce the torque output limit for the engine 52 to a reduced torque output limit corresponding to a predetermined percentage of the maximum torque output for the engine 52, such as a torque output limit ranging from 50% to less than 100% of the maximum torque output. In another embodiment, the controller 102 may reduce the torque output limit based on a torque limit associated with the axle assembly 58, 60 experiencing the highest loads.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a multi-axle work vehicle based on axle loading, the work vehicle include a chassis and an engine supported by the chassis, the system comprising:
    a track assembly including a drive wheel and a undercarriage support beam, the drive wheel configured to be rotatably coupled to the engine via an axle assembly, the track assembly further including a pivot pin configured to pivotally couple the undercarriage support beam to the chassis;
    a sensor configured to monitor a load associated with loads transmitted through the pivot pin; and
    a controller communicatively coupled to the sensor, the controller being configured to estimate an axle load applied through the axle assembly based on the monitored load, the controller being further configured to regulate the operation of an engine based on the estimated axle load,
    wherein the pivot pin corresponds to a load-sensing pin such that the sensor is integrated into the pivot pin.

2. The system of claim 1, wherein the controller is configured to compare the estimated axle load to a predetermined load threshold associated with the axle assembly.

3. The system of claim 2, wherein the controller is further configured to reduce a torque output limit for the engine when the estimated axle load exceeds the predetermined load threshold.

4. The system of claim 3, wherein the controller is configured to reduce the torque output limit to a reduced torque output limit ranging from 50% to less than 100% of a maximum torque output for the engine when the estimated axle load exceeds the predetermined load threshold.

5. The system of claim 1, wherein the pivot pin is located inboard or outboard of the drive wheel of the track assembly.

6. The system of claim 1, wherein the axle assembly corresponds to a first axle assembly, the sensor corresponds to a first sensor and the load corresponds to a first load, further comprising:
    a second track assembly including a second drive wheel and a second undercarriage support beam, the second drive wheel configured to be rotatably coupled to the engine via a second axle assembly, the second track assembly further including a second pivot pin configured to pivotally couple the second undercarriage support beam to the chassis; and
    a second sensor configured to monitor a second load associated with loads transmitted through the second pivot pin,
    wherein the controller is communicatively coupled to the first and second sensors, the controller being configured to estimate an axle load differential between the first and second axle assemblies based on the first and second loads, the controller being further configured to reduce a torque output limit for the engine when the estimated axle load differential increases above a load differential threshold.

7. A method for controlling a multi-axle work vehicle based on axle loading, the method comprising:
    monitoring a load associated with loads transmitted through a pivot pin of a track assembly of the work vehicle, the track assembly configured to be rotatably coupled to an engine of the work vehicle via an axle assembly;
    estimating an axle load applied through the axle assembly based on the monitored load;
    providing a control output for the work vehicle based on the estimated axle load;
    comparing the estimated axle load to a predetermined load threshold associated with the axle assembly; and
    reducing a torque output limit for the engine when the estimated axle load exceeds the predetermined load threshold.

8. The method of claim 7, wherein the control output is associated with regulating the operation of the engine.

9. The method of claim 7, wherein the control output is associated with adjusting a setting for the work vehicle based on the estimated axle load.

10. The method of claim 9, wherein the setting is associated with at least one of a ballast of the work vehicle or a service or maintenance interval for the work vehicle.

11. The method of claim 9, wherein the control output is used to provide a notification to an operator of the work vehicle associated with adjusting the setting for the work vehicle.

12. A method for controlling a multi-axle work vehicle based on axle loading, the method comprising:
    monitoring a first load associated with loads transmitted through a first pivot pin of a first track assembly of the work vehicle, the first track assembly configured to be rotatably coupled to an engine of the work vehicle via a first axle assembly;

monitoring a second load associated with loads transmitted through a second pivot pin of a second track assembly of the work vehicle, the second track assembly configured to be rotatably coupled to the engine via a second axle assembly;

estimating an axle load differential between the first and second axle assemblies based on the first and second loads; and reducing a torque output limit for the engine when the estimated axle load differential increases above a load differential threshold.

13. The method of claim 12, wherein reducing the torque output limit for the engine comprises reducing the torque output limit to a reduced torque output limit ranging from 50% to less than 100% of a maximum torque output for the engine.

14. The method of claim 12, wherein reducing the torque output limit for the engine comprises reducing the torque output limit to a reduced torque output limit determined based on the greater of the first and second loads.

15. The method of claim 14, further comprising, when the first load exceeds the second load, selecting the reduced torque output limit based on a torque limit associated with the first axle assembly.

16. The method of claim 14, further comprising, when the second load exceeds the first load, selecting the reduced torque output limit based on a torque limit associated with the second axle assembly.

17. The method of claim 12, wherein monitoring the first load comprises monitoring the first load with a first sensor associated with the first pivot pin and wherein monitoring the second load comprises monitoring the second load with a second sensor associated with the second pivot pin.

18. The method of claim 17, wherein the first and second pivot pins correspond to load-sensing pins, the first sensor being integrated into the first pivot pin and the second sensor being integrated into the second pivot pin.

19. The method of claim 12, wherein the first pivot pin is configured to pivotally couple a first undercarriage support beam of the first track assembly to a chassis of the work vehicle and wherein the second pivot pin is configured to pivotally couple a second undercarriage support beam of the second track assembly to the chassis of the work vehicle.

* * * * *